United States Patent
Chen et al.

(10) Patent No.: US 9,578,312 B2
(45) Date of Patent: Feb. 21, 2017

(54) METHOD OF INTEGRATING BINOCULAR STEREO VIDEO SCENES WITH MAINTAINING TIME CONSISTENCY

(71) Applicant: BEIHANG UNIVERSITY, Beijing (CN)

(72) Inventors: Xiaowu Chen, Beijing (CN); Dongqing Zou, Beijing (CN); Qinping Zhao, Beijing (CN); Feng Ding, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 193 days.

(21) Appl. No.: 14/444,421

(22) Filed: Jul. 28, 2014

(65) Prior Publication Data

US 2015/0195510 A1    Jul. 9, 2015

(30) Foreign Application Priority Data

Jan. 8, 2014    (CN) .......................... 2014 1 0008677

(51) Int. Cl.
*H04N 13/02* (2006.01)
*H04N 13/00* (2006.01)
(Continued)

(52) U.S. Cl.
CPC ........... *H04N 13/026* (2013.01); *G11B 27/031* (2013.01); *H04N 13/004* (2013.01);
(Continued)

(58) Field of Classification Search
CPC .............. G11B 27/031; H04N 13/0018; H04N 13/0022; H04N 13/0037; H04N 13/004; H04N 13/026; H04N 13/0456; H04N 2013/0081; H04N 2013/0085; H04N 2213/003; H04N 2213/005
See application file for complete search history.

(56) References Cited

U.S. PATENT DOCUMENTS

| | | | | |
|---|---|---|---|---|
| 5,850,352 A | * | 12/1998 | Moezzi | H04N 5/222 345/419 |
| 2012/0019614 A1 | * | 1/2012 | Murray | H04N 13/0007 348/36 |

OTHER PUBLICATIONS

Automatic contour generation of 4D CT by deformable registration, 2008 IEEE Pacific-Asia Workshop on Computational Intelligence and Industrial Application, Duan et al.*

* cited by examiner

*Primary Examiner* — Mohammed Rahaman
(74) *Attorney, Agent, or Firm* — Global IP Counselors, LLP

(57) ABSTRACT

A method of integrating binocular stereo video scenes with maintaining time consistency includes: propagating and extracting a contour of moving object of stereo video A; integrating and deformating of parallax between moving object and dynamic scene with time consistency; color blending of moving object and dynamic scene with time consistency where a method of median coordinate fusion is utilized. The method is simple and effective to utilize a small quantity of user interactions to successfully extract moving objects from stereo video which are same in time and as consistent as possible between left view and right view to develop multiple constraint conditions to guide the integration and deformation of parallax of moving object and dynamic scene and allow moving object to conform to the rules of perspective of dynamic scene. Moreover, the deformation result of moving object is smooth and consistent and can avoid effectively the occurrence of "dithering" phenomenon.

4 Claims, 2 Drawing Sheets

(51) Int. Cl.
*H04N 13/04* (2006.01)
*G11B 27/031* (2006.01)
(52) U.S. Cl.
CPC ..... *H04N 13/0018* (2013.01); *H04N 13/0022* (2013.01); *H04N 13/0037* (2013.01); *H04N 13/0456* (2013.01); *H04N 2013/0081* (2013.01); *H04N 2013/0085* (2013.01); *H04N 2213/003* (2013.01); *H04N 2213/005* (2013.01)

METHOD OF INTEGRATING BINOCULAR STEREO VIDEO SCENES WITH MAINTAINING TIME CONSISTENCY

TECHNICAL FIELD

The present invention is a new method of integrating binocular stereo video scenes with maintaining time consistency and belongs to the technical field of video image processing, binocular stereo vision.

BACKGROUND OF THE INVENTION

As the development of 3D film technique, the editing method of binocular video image has increasingly been the focus in recent years. However, it is relatively difficult to extend the existing methods of editing 2D video image to binocular video image because additional information such as parallax needs to be processed.

The integration of binocular stereo video scenes refers to that: two segments of binocular stereo video A and B are given to integrate the moving object of video A into the dynamic scene of video B with maintaining the consistency in color, parallax and time to yield an integration result of binocular stereo video scenes.

There have been many publications in the fields of computer vision and computer graphics concerning the method of editing 2D video image and the method of editing binocular video image. So we will not try to list exhaustively all of them here. Nevertheless, the works related to the video editing with time consistency will be introduced here as the focus and the integration methods of video image scene and the methods of editing binocular image will also be involved.

The ordinary method of editing monocular video has been studied to a relatively great deal in recent years. In 2002, Chuang et al. applied the bidirectional optical flow in an algorithm of inter-frame propagation of tri-map. In 2009, Bai et al. utilized a set of local classifiers and an optical flow algorithm to successfully achieve a result of better time consistency. In 2010, Bai et al. further applied the color flow in the propagation step of tri-map for accurate extracting video object. These methods can achieve a relatively good effect compared to ordinary editing of monocular video. However, these mask propagation methods can't be applied directly in the method of editing binocular stereo video. In 2008, Sand et al. proposed a practical method of long-term tracking. In 2009, Lee et al. utilized the flow field of scale-invariant feature transform (that is, SIFT) to put forward a video stabilization algorithm. And Bhat et al. applied the optical flow algorithm in an algorithm of editing multiple gradient-domain video in 2010. In 2012, Chen et al. applied the concept of maintaining local linear structure in editing and propagation of video. These algorithms of editing video with time consistency mainly focus on object tracking and content editing. But the purpose of the present invention is to simultaneously edit the shape and color of a binocular stereo video object.

The method of integrating video image scene is a conventional one of editing video image. In 2003, Perez et al. put forward a method of Poisson integration which solves a Poisson equation to integrate seamlessly the region into a new scene. In 2009, Jia et al. utilized accurate object extraction to further improve successfully the effect of Poisson integration. In 2009, Farbman et al. utilized the median coordinates to greatly increase successfully the rate of integration. In 2010, Xie et al. extended the median coordinate integration to the fusion of monocular video. In 2013, Chen et al. utilized the optical flow to successfully extend the median coordinate integration to video compositing. However, these methods haven't realized to maintain the time consistency of the extracted moving objects.

The method of editing binocular video image also relates to the works of the present invention. In 2010, Lo et al. proposed a method name as "billboard" to compose the object and scene of binocular image. In 2012, Luo et al. developed an iterative method of integrating binocular video scene which can adjust deformation and color simultaneously. In 2012, Niu et al. put forward a method of binocular image deformation according to user interaction and disparity map. All these methods are focusing on the editing operation of binocular image. Wang et al. in 2008 and Weng et al. in 2006 separately developed a method of image deformation. In 2010, Lang et al. put forward a method of video retargeting which utilized an optical flow to successfully ensure the inter-frame deformation and propagation.

SUMMARY OF THE INVENTION

The purpose of the present invention is to develop a new method of integrating binocular stereo video scene with maintaining time consistency. In order to realize the purpose, the present invention employs a technical solution as follows: first, to extract moving object of stereo video A. Utilize the algorithm of SIFT feature matching to automatically propagate the contour of the designated moving object of the first frame of stereo video A by left eye to the corresponding moving object of the first frame of stereo video A by right eye, then establish a relation of feature matching between moving object stereo video A by left eye and moving object stereo video A by right eye, separately propagate the contour of moving object of the first frame of stereo video A by left eye/right eye to the corresponding moving object of each other frame by left eye/right eye under the combined constraint of SIFT flow and the object contour deformation of left eye/right eye to extract moving object of stereo video A; then place moving object of stereo video A in dynamic scene of stereo video B to carry out parallax integration and deformation of moving object and dynamic scene with maintaining time consistency. Utilize the method of integration such as Poisson integration to yield the integrated disparity map sequence of moving object and dynamic scene which is then based to guide the deformation of moving object; finally, utilize the method of median coordinate integration to carry out color integration with time consistency between moving object and dynamic scene. The specific steps are described as follows.

The present invention is a method of integrating binocular stereo video scenes with maintaining time consistency, which comprises the steps as follows:

Step S100-propagation and extraction of a contour of moving object of stereo video A: the user applies an interactive method such as a brush to select the contour of a moving object of the first frame of stereo video A by left eye and it is automatically propagated to a corresponding moving object of the first frame by right eye; referring to this, the contours of moving objects of the first frames of stereo video A by left eye/right eye are separately propagated to corresponding moving objects of each other frame by left eye/right eye to extract moving object(s) of stereo video A; (note: in the present invention, unless specified specially, the processing sequence by left eye and right eye can be alternated. In order to describe clearly, left eye is used as an example throughout the present invention).

Step S200-Integration and deformation of parallax of moving object and dynamic scene with time consistency: the user specifies the position to place moving object of stereo video A into dynamic scene of stereo video B and the disparity map of the moving object region of stereo video A and that of stereo video B are integrated and then the result of integration is based to deform the moving object in a time-consistent manner to allow it conform to the rules of perspective of dynamic scene;

Step S300-Color blending of the moving object and dynamic scene with time consistency: utilize a method of median coordinate fusion (also referred to as median coordinate integration) to blend the colors of the moving object and dynamic scene.

Wherein: the "propagation and extraction of moving object of stereo video A" described in Step S100 comprises the substeps as follows:

Step S110-Calculate separately SIFT flow field of each frame between left eye and right eye and SIFT flow field between two consecutive frames by left eye/right eye for stereo video A; calculate SIFT feature matching point pairs for the first frame of stereo video A by left eye and the first frame by right eye and utilize the method of Random Sample Consensus (RANSAC) to remove the mismatching;

Step S120-User applies an interactive mode such as brush to select a rough contour of moving object on the first frame stereo video A by left eye; use SIFT matching points inside the contour of moving object in Step S110 and the points of sampling the contour of moving object as mesh vertexes to triangulate the moving object and yield the mesh of moving object of the first frame of stereo video A by left eye. Then a method put forward by Luo et al. is utilized to propagate the mesh from the first frame of stereo video A by left eye to the first frame of stereo video A by right eye through SIFT feature point matching and the constraints of triangle mesh distortion;

Step S130-Propagate the mesh of moving object of the first frame of stereo video A by left eye/right eye to the moving object of each other frame of stereo video A to complete the extraction of moving object; set $\{T_c^t;t=L, R\}$ to denote the collection of all the triangles of the triangle mesh of the known moving object of current frame by left eye/right eye and set $\{v_c^t(i);t=R, L\}$ to denote the collection of all the vertexes of current corresponding mesh, then the propagation of the contour of moving object is to solve the coordinates of all the vertexes of the vertex collection $\{v_n^t(i);t=R, L\}$ of the triangle mesh $\{T_n^t;t=L, R\}$ of moving object of next frame by left eye/right eye. The present invention realizes the propagation of contour of moving object through minimization of the energy equation as follows;

$$E=\lambda_1 E_1+\lambda_2 E_2+\lambda_3 E_3+\lambda_4 E_4$$

Wherein: E denotes the overall energy, $E_1$ denotes the constraint energy corresponding to the inter-frame feature points, $E_2$ denotes the constraint energy against triangle mesh distortion, $E_3$ denotes the constraint energy against association relation between the meshes of left eye/right eye, $E_4$ denotes the constraint energy against vertical aligning, $\lambda_1, \lambda_2, \lambda_3, \lambda_4$ denote the weights of each energy term;

The energy equation comprises four energy terms which indicate separately four types of constraint conditions, wherein: $E_1$ denotes the constraint energy corresponding to the inter-frame feature points. The mesh vertexes of current frame can be propagated to the corresponding frame(s) through SIFT flow and the present invention selects the vertex(s) of high confidence level for propagation to satisfy the energy term:

$$E_1 = \sum_{i=1}^{n_f} \|v_n^L(i) - v_n^L(s(i))\|^2 + \sum_{i=1}^{n_f} \|v_n^R(i) - v_n^R(s(i))\|^2$$

This energy term will constrain each mesh vertex $\{v_n^t(i); t=R, L\}$ of next frame to be as close as possible to the position $\{v_c^t(s(i)); t=R, L\}$ of next frame to which each vertex $\{v_c^t(i); t=R, L\}$ of current frame is propagated through SIFT flow.

$n_f$ is the number of reliable vertexes. The present invention selects preferably the vertexes corresponding to the matching point pairs in Step S110 as the reliable points or the characteristics of SIFT features are based to allow the user to select the points of high confidence level for propagation.

$E_2$ is the constraint energy against triangle mesh distortion where the shape of mesh should not change dramatically after propagated from previous frame.

There are three vertexes $(v_i, v_j, v_k)$ for a mesh triangle. The vertex $v_i$ is expressed linearly by other two vertexes $v_j$, $v_k$ as $v_i=F_S(v_j, v_k)$. The energy to constrain triangle mesh distortion is:

$$E_2 = \sum_{(v_n^L(i),v_n^L(j),v_n^L(k))\in T_n^L} \|v_n^L(i) - F_S^L(v_n^L(j), v_n^L(k))\|^2 + \\ \sum_{(v_n^R(i),v_n^R(j),v_n^R(k))\in T_n^R} \|v_n^R(i) - F_S^R(v_n^R(j), v_n^R(k))\|^2$$

$F_S^L$, $F_S^R$ separately denotes the linear relation between two vertexes of two corresponding triangles by left eye and right eye. This energy term constrains the shape of each triangle in the triangle mesh of next frame to be as close as possible to the shape of corresponding triangle of current frame.

$E_3$ is the constraint energy against an association relation between the meshes of left eye/right eye where left eye and right eye have a corresponding association relation for a binocular stereo video. If the contour of moving object of left eye or right eye is independently propagated downward, an inconsistency may possibly occur the corresponding between the meshes of left eye and right eye and further cause an inconsistency between moving object by left eye and moving object by right eye. In order to maintain the association relation between left eye and right eye and guarantee consistency of the contents of moving object between by left eye and by right eye, a constraint is needed for the association relation between left eye and right eye:

$$E_3 = \sum_{i=1}^{n_f} \|v_n^L(i) - v_n^{R\rightarrow L}(s(i))\|^2 + \sum_{i=1}^{n_f} \|v_n^R(i) - v_n^{L\rightarrow R}(s(i))\|^2$$

Because the mesh positions of next frame by left eye and by right eye are unknown yet, so the association relation between them can't be established directly.

Thus, the present invention sets the positions yielded after twice transmission of the coordinates of vertex positions of the meshes of current frame as the direction for constraint optimization. For example, as for the constraint of association relation from the mesh of left eye to the mesh of right eye, the reliable vertex $v_c^L(i)$ of the mesh of current frame by left eye is firstly propagated to the position s(i) of next frame by left eye through the SIFT flow between current frame and next frame by left eye and then the s(i) is propagated to the corresponding position $v_n^{R \to L}(s(i))$ by right eye through the SIFT flow between next frame by left eye and next frame by right eye. The present invention constrains the vertex position $v_n^R(i)$ of next frame by right eye to be as close as possible to the calculated vertex position $v_n^{R \to L}(s(i))$. Similarly, the association relation from the mesh by right eye to the mesh by left eye is also constrained.

$E_4$ is the constraint energy against vertical aligning. For a binocular stereo image, the corresponding contents in left eye and right eye are same in the vertically direction of image space. Thus, the present invention constrains the coordinates of y to be similar as much as possible to the corresponding vertexes of the meshes by left eye and by right eye. The energy term here is as follows:

$$E_4 = \sum_{i=1}^{n} (v_n^L(i)[y] - v_n^R(i)[y])^2$$

These four energy terms constitute together the combined energy constraint against the contour propagation of moving object and we use $\lambda_1 = \lambda_3 = \lambda_4 = 10$, $\lambda_2 = 1$ as the reference weight of each energy term.

Wherein: the "integration and deformation of parallax of moving object and dynamic scene with time consistency" described in Step S200 comprises the substeps as follows:

S210-Calculate the disparity map of each frame of stereo video A and stereo video B. Utilize Poisson integration and other integration methods to merge the disparity map in the area corresponding to moving object in stereo video A and the disparity map of stereo video B to yield an integration disparity map sequence which can be denoted as $D = \{d_1, d_2, d_3 \ldots\}$.

Step S220-Utilize the method based on perspective perception deformation put forward by Luo et al. to carry out the parallax integration and deformation whose result is then set as the initial solution.

Step S230-Adjust and deform automatically the parallax with time consistency for the moving objects and the dynamic scenes of all other frames. Assuming the result of deformation of moving objects of frame i is known. $V_i^L$, $V_i^R$ is separately set as the vertex collection of the triangle mesh corresponding to moving object of frame i by left eye and by right eye. The deformation result of moving object of frame i+1 and frame i+2 can be realized through minimization of the following energy equation:

$$N = \gamma_1 N_1 + \gamma_2 N_2 + \gamma_3 N_3$$

Wherein: N denotes the overall energy, $N_1$ denotes the constraint energy for parallax corresponding, $N_2$ denotes the positioning constraint energy, $N_3$ denotes the constraint energy against mesh distortion of moving object. $\gamma_1$, $\gamma_2$, $\gamma_3$ denote the weight of each energy term.

The energy equation includes three energy terms which separately denote three types of constraint conditions. Wherein: $N_1$ is the constraint energy for parallax corresponding to constrain that the parallax of each vertex of the mesh of moving object to be consistent with the parallax of the corresponding position of integrated disparity map.

$$N_1 = \sum_{v_t^L \in V_{i+1}^L, v_t^R \in V_{i+1}^R, v_o^L \in \hat{V}_{i+1}^L} (v_t^L[x] - v_t^R[x] - d_{i+1}(v_o^L))^2 +$$
$$\sum_{v_t^L \in V_{i+2}^L, v_t^R \in V_{i+2}^R, v_o^L \in \hat{V}_{i+2}^L} (v_t^L[x] - v_t^R[x] - d_{i+2}(v_o^L))^2$$

$V_{i+1}^L$, $V_{i+1}^R$ separately denotes the mesh vertex collection after moving object deformation of frame i by left eye/right eye; $\hat{V}_{i+1}^L$ denotes the mesh vertex collection before moving object deformation of frame i+1 by left eye. The symbol representation of frame i+2 is same as that of frame i+1. $v_t^L[x]$, $v_t^R[x]$ denote the coordinates of x of the corresponding vertex.

$N_2$ is the positioning constraint energy to constrain that the position of geometry center of moving object by left eye to be same as much as possible with the geometry center of moving object by left eye before deformation;

$$N_2 = \left\| c_{i+1}^l - \frac{1}{|V^L|} \sum_{v_t^L \in V_{i+1}^L} v_t^L \right\|^2 + \left\| c_{i+2}^l - \frac{1}{|V^L|} \sum_{v_t^L \in V_{i+2}^L} v_t^L \right\|^2$$

$c_{i+1}^l$, $c_{i+2}^l$ are separately the mesh geometry center before moving object deformation of frame i+1 and frame i+2 by left eye.

$N_3$ is the constraint energy against mesh distortion of moving object to constrain the deformation of previous and next frames as well as left and right frames not to be violent too much.

$$N_3 = \sum_{(v_{i+1}^L(t), v_{i+1}^L(j), v_{i+1}^L(k)) \in T_{i+1}^L} \delta_{i+1}^L \| v_{i+1}^L(t) - F^L(v_{i+1}^L(j), v_{i+1}^L(k)) \|^2 +$$
$$\sum_{(v_{i+1}^R(t), v_{i+1}^R(j), v_{i+1}^R(k)) \in T_{i+1}^R} \delta_{i+1}^R \| v_{i+1}^R(t) - F^R(v_{i+1}^R(j), v_{i+1}^R(k)) \|^2 +$$
$$\sum_{(v_{i+2}^L(t), v_{i+2}^L(j), v_{i+2}^L(k)) \in T_{i+2}^L} \delta_{i+2}^L \| v_{i+2}^L(t) - F^L(v_{i+2}^L(j), v_{i+2}^L(k)) \|^2 +$$
$$\sum_{(v_{i+2}^R(t), v_{i+2}^R(j), v_{i+2}^R(k)) \in T_{i+2}^R} \delta_{i+2}^R \| v_{i+2}^R(t) - F^R(v_{i+2}^R(j), v_{i+2}^R(k)) \|^2$$

$T_{i+1}^L$, $T_{i+1}^R$ are separately the triangle collection of the triangle mesh of moving object of frame i+1 by left eye/right eye. Similarly, $T_{i+2}^L$, $T_{i+2}^R$ is the triangle collection of the triangle mesh of moving object of frame i+2 by left eye/right eye. v(t), v(j), v(k) are separately the three vertexes of the corresponding triangle. $F^L$, $F^R$ are separately the linear relation between different vertexes of each triangle of the mesh of moving object of frame i by left eye/right eye. $\delta_{i+1}$ is the smoothing factor which is calculated with $e^{-\|F(v_{i+1}(j), v_{i+1}(k)) - F(v_i(j), v_i(k))\|^2}$ and $\delta_{i+2}$ is calculated in the same way.

These three energy terms constitute together the combined energy constraint against the moving object deformation with time consistency. We use $\gamma_1 = 50$, $\gamma_2 = \gamma_3 = 1$ as the reference weight of each energy term.

Step S240-After Step S230, two solutions will be generated for the coordinate of each vertex of the mesh corresponding to the moving object of each frame by left eye/right eye. Then the average value of them is calculated as the final result of deformation.

Wherein: the "color blending of a moving object and dynamic scene with time consistency" described in Step S300 is implemented through: utilize a method of median coordinate fusion (also referred to as median coordinate integration) to calculate the internal vertexes of the moving object mesh against the median coordinate of the boundary vertexes of mesh; utilizing the color difference between the pixel corresponding to the median coordinates and the boundary points of dynamic moving object and the pixel of the position corresponding to dynamic scene to calculate the color difference of the internal vertexes of the moving object. The color difference of the pixel points of non-vertex point(s) is obtained through linear interpolation of the color difference among three vertexes of the triangle mesh patch where the pixels of non-vertex lie in. Add the color difference and the color value of the original pixel of the moving object to yield the result of color blending.

The present invention develops a new method of integrating binocular stereo video scene with maintaining time consistency whose advantages and effects are: 1. it is simple and effective to utilize a small quantity of user interactions to successfully extract moving objects from stereo video which are same in time and as consistent as possible between left eye and right eye; 2. it develops multiple constraint conditions to guide the integration and deformation of parallax of moving object and dynamic scene and allow moving object to conform to the rules of perspective of dynamic scene. Moreover, the deformation result of moving object is smooth and consistent and can avoid effectively the occurrence of "dithering" phenomenon.

EMBODIMENT

Now the present invention is further described in detail with the drawings as follows.

Figure 1:
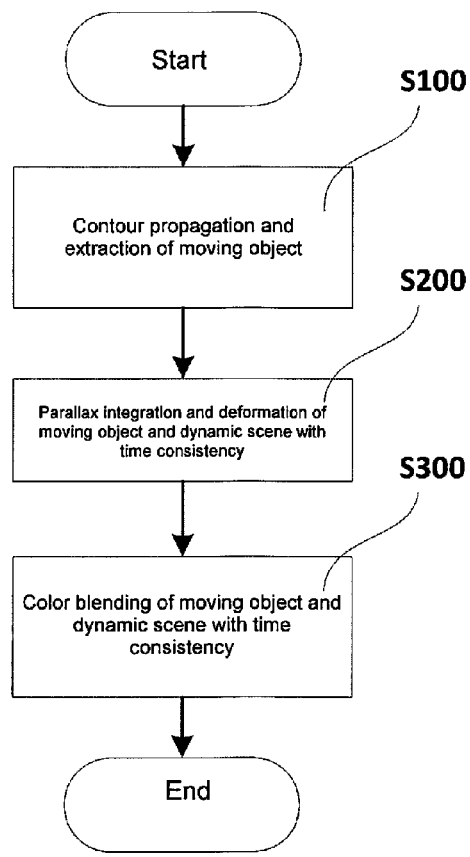
FIG. 1 is the flow chart of the present invention.

FIG. 1 is the flow chart of the present invention, where the method according the present invention comprises three steps:

Step S100-propagation and extraction of contour of moving object of stereo video A: the user applies an interactive method such as a brush to select the contour of a moving object of the first frame of stereo video A by left eye. It is automatically propagated to a corresponding moving object of the first frame by right eye. Referring to this, the contours of moving objects of the first frames of stereo video A by left eye/right eye are separately propagated to corresponding moving objects of each other frame by left eye/right eye to extract moving object(s) of stereo video A.

Step S200-Integration and deformation of parallax of moving object and dynamic scene with time consistency: the user specifies the position to place moving object of stereo video A into dynamic scene of stereo video B. The disparity map of the moving object region of stereo video A and that of stereo video B are integrated and then the result of integration is based to deform the moving object in a time-consistent manner to allow it conform to the rules of perspective of dynamic scene.

Step S300-Color blending of moving object and dynamic scene with time consistency: utilize a method of median coordinate fusion to blend the colors of moving object and dynamic scene.

The "propagation and extraction of moving object of stereo video A" described in Step S100 comprises the sub-steps as follows:

Step S110-Calculate separately SIFT flow field of each frame between left eye and right eye and SIFT flow field between two consecutive frames by left eye/right eye for stereo video A. Calculate SIFT feature matching point pairs for the first frame of stereo video A by left eye and the first frame by right eye and utilize the method of RANSAC to remove the mismatching.

Step S120-User applies an interactive mode such as brush to select a rough contour of moving object on the first frame stereo video A by left eye. Use SIFT matching points inside the contour of moving object in Step S110 and the points of sampling the contour of moving object as mesh vertexes to triangulate the moving object and yield the mesh of moving object of the first frame of stereo video A by left eye. Then a method put forward by Luo et al. is utilized to propagate the mesh from the first frame of stereo video A by left eye to the first frame of stereo video A by right eye through SIFT feature point matching and the constraints of triangle mesh distortion.

Step S130-Propagate the mesh of moving object of the first frame of stereo video A by left eye/right eye to the moving object of each other frame of stereo video A to complete the extraction of moving object.

Set $\{T_c^t; t=L, R\}$ to denote the collection of all the triangles of the triangle mesh of the known moving object of current frame by left eye/right eye and set $\{v_c^t(i); t=R, L\}$ to denote the collection of all the vertexes of current corresponding mesh. Then the propagation of the contour of moving object is to solve the coordinates of all the vertexes of the vertex collection $\{v_n^t(i); t=R, L\}$ of the triangle mesh $\{T_n^t; t=L, R\}$ of moving object of next frame by left eye/right eye. The present invention realizes the propagation of contour of moving object through minimization of the energy equation as follows.

$$E = \lambda_1 E_1 + \lambda_2 E_2 + \lambda_3 E_3 + \lambda_4 E_4$$

The energy equation comprises four energy terms which indicate separately four types of constraint conditions. Wherein: $E_1$ denotes the constraint energy corresponding to the inter-frame feature points. The mesh vertexes of current frame can be propagated to the corresponding frame(s) through SIFT flow and the present invention selects the vertex(es) of high confidence level for propagation. They satisfy the energy term:

$$E_1 = \sum_{i=1}^{n_f} \|v_n^L(i) - v_n^L(s(i))\|^2 + \sum_{i=1}^{n_f} \|v_n^R(i) - v_n^R(s(i))\|^2$$

This energy term will constrain each mesh vertex $\{v_n^t(i); t=R, L\}$ of next frame to be as close as possible to the position $\{v_c^t(s(i)); t=R, L\}$ of next frame to which each vertex $\{v_c^t(i); t=R, L\}$ of current frame is propagated through SIFT flow. $n_f$ is the number of reliable vertexes. The present invention selects preferably the vertexes corresponding to the matching point pairs in Step S110 as the reliable points or the characteristics of SIFT features are based to allow the user to select the points of high confidence level for propagation.

$E_2$ is the constraint energy against triangle mesh distortion where the shape of mesh should not change dramatically after propagated from previous frame. There are three vertexes ($v_i$, $v_j$, $v_k$) for a mesh triangle. The vertex $v_i$ is expressed linearly by other two vertexes $v_j, v_k$ as $v_i = F_S(v_j, v_k)$. The energy to constrain triangle mesh distortion is:

$$E_2 = \sum_{(v_n^L(i), v_n^L(j), v_n^L(k)) \in T_n^L} \|v_n^L(i) - F_S^L(v_n^L(j), v_n^L(k))\|^2 +$$

$$\sum_{(v_n^R(i), v_n^R(j), v_n^R(k)) \in T_n^R} \|v_n^R(i) - F_S^R(v_n^R(j), v_n^R(k))\|^2$$

$F_S^L$, $F_S^R$ separately denotes the linear relation between two vertexes of two corresponding triangles by left eye and right eye. This energy term constrains the shape of each triangle in the triangle mesh of next frame to be as close as possible to the shape of corresponding triangle of current frame.

Figure 2:
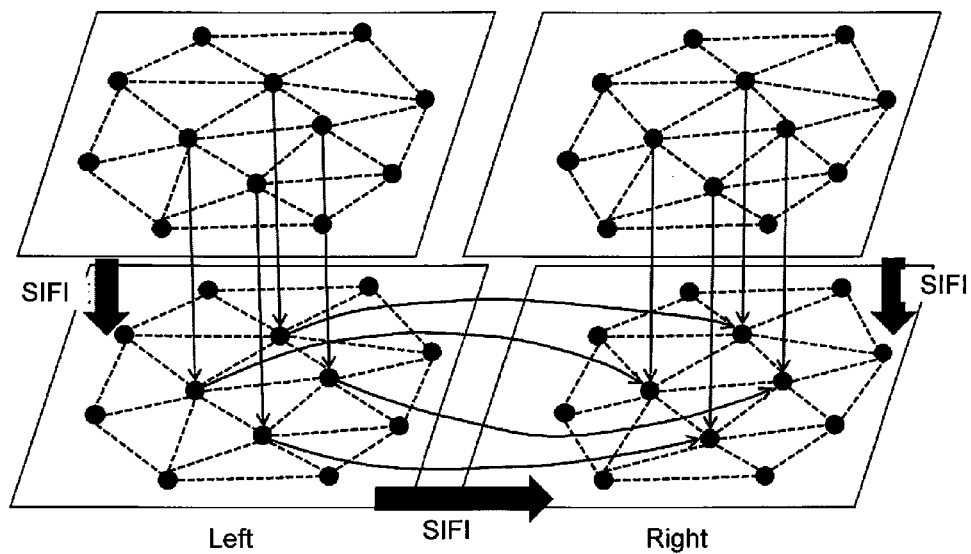
FIG. 2 is the schematic diagram of association relation between the propagation object of the contour of moving object according to the present invention.

$E^3$ is the constraint energy against an association relation between the meshes of left eye/right eye which is shown as FIG. 2. Left eye and right eye have a corresponding association relation for a binocular stereo video. If the contour of moving object of left eye or right eye is independently propagated downward, an inconsistency may possibly occur the corresponding between the meshes of left eye and right eye and further cause an inconsistency between moving object by left eye and moving object by right eye. In order to maintain the association relation between left eye and right eye and guarantee consistency of the contents of moving object between by left eye and by right eye, a constraint is needed for the association relation between left eye and right eye:

$$E_3 = \sum_{i=1}^{n_f} \|v_n^L(i) - v_n^{R \to L}(s(i))\|^2 + \sum_{i=1}^{n_f} \|v_n^R(i) - v_n^{L \to R}(s(i))\|^2$$

Because the mesh positions of next frame by left eye and by right eye are unknown yet, so the association relation between them can't be established directly.

Thus, the present invention sets the positions yielded after twice transmission of the coordinates of vertex positions of the meshes of current frame as the direction for constraint optimization. For example, as for the constraint of association relation from the mesh of left eye to the mesh of right eye, the reliable vertex of the mesh of current frame by left eye is firstly propagated to the position of next frame by left eye through the SIFT flow between current frame and next frame by left eye and then the is propagated to the corresponding position by right eye through the SIFT flow between next frame by left eye and next frame by right eye. The present invention constrains the vertex position of next frame by right eye to be as close as possible to the calculated vertex position. Similarly; the association relation from the mesh by right eye to the mesh by left eye is also constrained.

$E^4$ is the constraint energy against vertical aligning. For a binocular stereo image, the corresponding contents in left eye and right eye are same in the vertically direction of image space. Thus, the present invention constrains the coordinates of y to be similar as much as possible to the corresponding vertexes of the meshes by left eye and by right eye. The energy term here is as follows:

$$E_4 = \sum_{i=1}^{n} (v_n^L(i)[y] - v_n^R(i)[y])^2$$

These four energy terms constitute together the combined energy constraint against the contour propagation of moving object and we use $\lambda_r = \lambda_3 = \lambda_4 = 10$, $\lambda_2 = 1$ as the reference weight of each energy term.

FIG. 2 is the schematic diagram of association relation between the propagation object of the contour of moving object according to the present invention. It denotes the constraint of association relation of the mesh of moving object by left eye/right eye.

Wherein: the "integration and deformation of parallax of moving object and dynamic scene with time consistency" described in Step S200 comprises the substeps as follows:

S210-Calculate the disparity map of each frame of stereo video A and stereo video B. Utilize Poisson integration and other integration methods to merge the disparity map in the area corresponding to moving object in stereo video A and the disparity map of stereo video B to yield an integration disparity map sequence which can be denoted as D={$d_1$, $d_2$, $d_3$ ... }.

Step S220-Utilize the method based on perspective perception deformation put forward by Luo et al. to carry out the parallax integration and deformation whose result is then set as the initial solution.

Step S230-Adjust and deform automatically the parallax with time consistency for the moving objects and the dynamic scenes of all other frames. Assuming the result of deformation of moving objects of frame i is known. $V_i^L$, $V_i^R$ is separately set as the vertex collection of the triangle mesh corresponding to moving object of frame i by left eye and by right eye. The deformation result of moving object of frame i+1 and frame i+2 can be realized through minimization of the following energy equation:

$$N = \gamma_1 N_1 + \gamma_2 N_2 + \gamma_3 N_3$$

Wherein: N denotes the overall energy, $N_1$ denotes the constraint energy for parallax corresponding, $N_2$ denotes the positioning constraint energy, $N_3$ denotes the constraint energy against mesh distortion of moving object. $\gamma_1$, $\gamma_2$, $\gamma_3$ denote the weight of each energy term.

The energy equation includes three energy terms which separately denote three types of constraint conditions. Wherein: $N_1$ is the constraint energy for parallax corresponding to constrain that the parallax of each vertex of the mesh of moving object to be consistent with the parallax of the corresponding position of integrated disparity map.

$$N_1 = \sum_{v_t^L \in V_{i+1}^L, v_t^R \in V_{i+1}^R, v_o^L \in \hat{V}_{i+1}^L} (v_t^L[x] - v_t^R[x] - d_{i+1}(v_o^L))^2 +$$

$$\sum_{v_t^L \in V_{i+2}^L, v_t^R \in V_{i+2}^R, v_o^L \in \hat{V}_{i+2}^L} (v_t^L[x] - v_t^R[x] - d_{i+2}(v_o^L))^2$$

$V_{i+1}^L$, $V_{i+1}^R$ separately denotes the mesh vertex collection after moving object deformation of frame i by left eye/right eye; $\hat{V}_{i+1}^L$ denotes the mesh vertex collection before moving object deformation of frame i+1 by left eye. The symbol representation of frame i+2 is same as that of frame i+1. $v_t^L[x]$, $v_t^R[x]$ denote the coordinates of x of the corresponding vertex.

$N_2$ is the positioning constraint energy to constrain that the position of geometry center of moving object by left eye to be same as much as possible with the geometry center of moving object by left eye before deformation.

$$N_2 = \left\| c_{i+1}^l - \frac{1}{|V^L|} \sum_{v_t^L \in V_{i+1}^L} v_t^L \right\|^2 + \left\| c_{i+2}^l - \frac{1}{|V^L|} \sum_{v_t^L \in V_{i+2}^L} v_t^L \right\|^2$$

$c_{i+1}^l$, $c_{i+2}^l$ are separately the mesh geometry center before moving object deformation of frame i+1 and frame i+2 by left eye.

$N_3$ is the constraint energy against mesh distortion of moving object to constrain the deformation of previous and next frames as well as left and right frames not to be violent too much.

$$N_3 = \sum_{(v_{i+1}^L(t), v_{i+1}^L(j), v_{i+1}^L(k)) \in T_{i+1}^L} \delta_{i+1}^L \| v_{i+1}^L(t) - F^L(v_{i+1}^L(j), v_{i+1}^L(k)) \|^2 +$$
$$\sum_{(v_{i+1}^R(t), v_{i+1}^R(j), v_{i+1}^R(k)) \in T_{i+1}^R} \delta_{i+1}^R \| v_{i+1}^R(t) - F^R(v_{i+1}^R(j), v_{i+1}^R(k)) \|^2 +$$
$$\sum_{(v_{i+2}^L(t), v_{i+2}^L(j), v_{i+2}^L(k)) \in T_{i+2}^L} \delta_{i+2}^L \| v_{i+2}^L(t) - F^L(v_{i+2}^L(j), v_{i+2}^L(k)) \|^2 +$$
$$\sum_{(v_{i+2}^R(t), v_{i+2}^R(j), v_{i+2}^R(k)) \in T_{i+2}^R} \delta_{i+2}^R \| v_{i+2}^R(t) - F^R(v_{i+2}^R(j), v_{i+2}^R(k)) \|^2$$

$T_{i+1}^L$, $T_{i+1}^R$ are separately the triangle collection of the triangle mesh of moving object of frame i+1 by left eye/right eye. Similarly, $T_{i+2}^L$, $T_{i+2}^R$ is the triangle collection of the triangle mesh of moving object of frame i+2 by left eye/right eye. v(t), v(j), v(k) are separately the three vertexes of the corresponding triangle. $F^L$, $F^R$ are separately the linear relation between different vertexes of each triangle of the mesh of moving object of frame i by left eye/right eye. $\delta_{i+1}$ is the smoothing factor which is calculated with $e^{-\|F(v_{i+1}(j), v_{i+1}(k)) - F(v_i(j), v_i(k))\|^2}$ and $\delta_{i+2}$ is calculated in the same way.

These three energy terms constitute together the combined energy constraint against the moving object deformation with time consistency. We use $\gamma_1 = 50$, $\gamma_2 = \gamma_3 = 1$ as the reference weight of each energy term.

Step S240-After Step S230, two solutions will be generated for the coordinate of each vertex of the mesh corresponding to the moving object of each frame by left eye/right eye. Then the average value of them is calculated as the final result of deformation.

Figure 3:
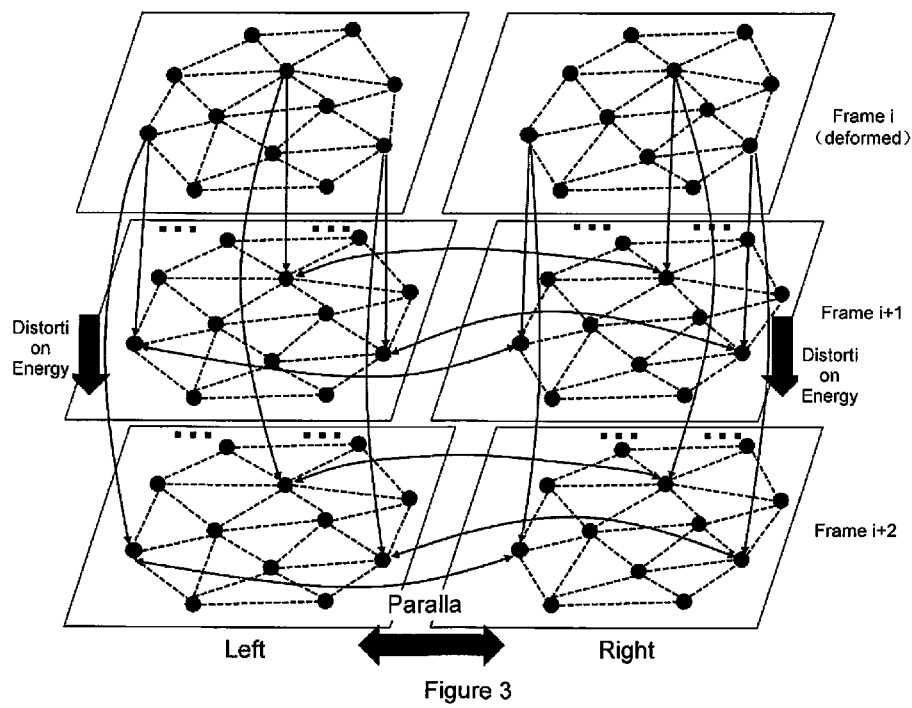
FIG. 3 is the schematic diagram of association relation between the objects of parallax integration deformation of moving object and dynamic scene according to the present invention.

FIG. 3 is the schematic diagram of association relation between the objects of parallax integration deformation of moving object and dynamic scene according to the present invention.

In conclusion, the present invention discloses a method of integrating binocular stereo video scene with maintaining time consistency which can integrate moving object of stereo video A into dynamic scene of stereo video B and maintain the consistency of color, parallax and time. This method comprises three steps: to utilize an algorithm of SIFT feature matching to automatically propagate the contour of a designated moving object of the first frame of stereo video A by left eye to the corresponding moving object of the first frame of stereo video A by right eye, then to establish a relation of feature matching between moving object of stereo video A by left eye and moving object of stereo video A by right eye, and separately propagate the contour of moving object of the first frame of stereo video A by left eye/right eye to the corresponding moving object of each other frame by left eye/right eye under the combined constraint of SIFT flow and the deformation of the object contour by left eye/right eye to extract the moving object of stereo video A; then place moving object of stereo video A in dynamic scene of stereo video B to carry out the parallax integration deformation between moving object and dynamic scene with maintaining time consistency; finally, utilize a method of median coordinate integration to realize the color blending with time consistency between moving object of stereo video A and dynamic scene of stereo video B. The present invention develops two points of innovations. The first is the method of contour propagation and extraction of moving object from stereo video; the second is the method of integrating color and parallax with time consistency for moving object and dynamic scene. So the present invention can be applied in the fields of video image processing and film and television production, etc.

What is claimed is:

1. A method of integrating binocular stereo video scenes while maintaining temporal consistency, comprising:
    propagating and extracting contours of a moving object from a stereo video A, in which in response to a user selecting the contours of the moving object by applying an interactive method such as a brush, extracting the user selected contours of the moving object from a first left frame from stereo video A and inserting the user selected contours of moving object into a first left frame of a stereo video B and further automatically propagating a corresponding image of the moving object from a first right frame from the stereo video A to the first right frame from the stereo video B, the contours of the moving objects for the first left frame and the first right frame from the stereo video A are separately propagated to correspond to the contours of the moving object for all other frames for a left eye view and a right eye view;
    integrating and deforming of parallax of the contours of the moving object and a dynamic scene of the stereo video B with temporal consistency, in which a position to place the contours of the moving object from the stereo video A into the dynamic scene of the stereo video B is determined based on in response to the user specifying the position, and for each frame a calculated disparity map based on regions of the moving object of the stereo video A and a calculated disparity map based on the specified position of the stereo video B are integrated to produce an integrated disparity map and thereafter the integrated disparity map is used to deform the contours of the moving object in a time-consistent manner to allow it conform to the rules of perspective of the dynamic scene of the stereo video B; and
    color blending of the contours of the moving object and the dynamic scene of the stereo video B with temporal consistency utilizing a method of a median coordinate fusion to blend the colors of the contours of the moving object and the dynamic scene of the stereo video B.

2. The method of integrating binocular stereo video scene while maintaining temporal consistency according to claim 1, further comprising:

the propagating and extracting of the contours of the moving object of stereo video A comprises the substeps as follows:

calculating separately a scale-invariant feature transform (SIFT) flow field for each frame between the left eye view and the right eye view and the SIFT flow field between two consecutive frames of the left eye view and the right eye view for stereo video A; calculating SIFT feature matching point pairs for the first left frame of stereo video A and the first right frame and utilizing a method of Random Sample Consensus (RANSAC) to remove mismatching;

in response to the user applying an interactive mode using the brush to select the contours of the moving object on the first left frame of stereo video A; using the SIFT matching points inside the contours of the moving object in separate calculating of the SIFT flow field and the SIFT matching points of the contours of the moving object defining mesh vertexes to triangulate the contours of the moving object and yielding a mesh of triangles of the contours of the moving object of the first left frame of stereo video A, then a method put forward by Luo et al. is utilized to propagate the mesh of the first left frame of stereo video A to the first right frame of stereo video A through the SIFT feature matching point pairs and the constraints of mesh distortion of the triangles;

propagating the mesh of the contours of the moving object of the first left frame and the right frame of stereo video A to the contours of the moving object in each other frame of the stereo video A to complete the extraction of the contours of the moving object; a triangle mesh $\{T_c^t; t=L, R\}$ being set to denote the collection of all of the triangles of the mesh of the contours of the moving object of current left frame and the current right frame and a vertex collection $\{v_c^t(i); t=R, L\}$ being set to denote the collection of all of the mesh vertexes, then the propagation of the contours of the moving object solving the coordinates of all the mesh vertexes of the vertex collection $\{v_n^t(i); t=R, L\}$ of the triangle mesh $\{T_n^t; t=L, R\}$ of the contours of the moving object of a next left frame and a next right frame, propagating of contours of the moving object through minimization of an energy equation as follows;

$$E = \lambda_1 E_1 + \lambda_2 E_2 + \lambda_3 E_3 + \lambda_4 E_4$$

wherein: E denotes overall energy, $E_1$ denotes a constraint energy corresponding to inter-frame feature points, $E_2$ denotes the constraint energy against triangle mesh distortion, $E_3$ denotes the constraint energy against association relation between the meshes of the left eye view and the right eye view, $E_4$ denotes the constraint energy against vertical aligning, $\lambda_1, \lambda_2, \lambda_3, \lambda_4$ denote the weights of each energy term;

the energy equation comprises four energy terms which indicate separately four types of constraint conditions, wherein: $E_1$ denotes the constraint energy corresponding to the inter-frame feature points, the mesh vertexes of current frames being propagated to the corresponding frame(s) through SIFT flow field and vertex(s) having high confidence levels being selected for propagation to satisfy the energy term:

$$E_1 = \sum_{i=1}^{n_f} \|v_n^L(i) - v_n^L(s(i))\|^2 + \sum_{i=1}^{n_f} \|v_n^R(i) - v_n^R(s(i))\|^2$$

the energy term constrains each mesh vertex $\{v_n^t(i); t=R, L\}$ of a next frame to be as close as possible to the position $\{v_c^t(s(i)); t=R, L\}$ of the next frame to which each vertex collection $\{v_c^t(i); t=R, L\}$ of the current frame is propagated through SIFT flow field; $n_f$ is the number of reliable vertexes; the vertexes corresponding to the matching point pairs in the calculating separately of the SIFT flow field are preferred as the reliable points and the characteristics of SIFT features matching point pairs are also based to allow the user to select points of high confidence level for propagation;

$E_2$ is the constraint energy against triangle mesh distortion where the shape of the mesh should not change dramatically after propagated from previous frame; three vertexes $(v_i, v_j, v_k)$ for a mesh triangle and the vertex $v_i$ is expressed linearly by other two vertexes as $v_j, v_k$ as $v_i = F_s(v_j, v_k)$, the energy to constrain triangle mesh distortion is:

$$E_2 = \sum_{(v_n^L(i), v_n^L(j), v_n^L(k)) \in T_n^L} \|v_n^L(i) - F_S^L(v_n^L(j), v_n^L(k))\|^2 + \sum_{(v_n^R(i), v_n^R(j), v_n^R(k)) \in T_n^R} \|v_n^R(i) - F_S^R(v_n^R(j), v_n^R(k))\|^2$$

$F_S^L, F_S^R$ separately denotes the linear relation between two vertexes of two corresponding triangles of left eye view and the right eye view, the energy term constrains the shape of each triangle in the triangle mesh of next frame to be as close as possible to the shape of corresponding triangle of current frame;

$E_3$ is the constraint energy against an association relation between the meshes of left eye view and the right eye view where the left eye view and the right eye view have a corresponding association relation for a binocular stereo video, such that if the contours of the moving object of left eye view or the right eye view is independently propagated downward, an inconsistency may possibly occur in correspondence between the meshes of left eye view and the right eye view and further cause an inconsistency between the contours of the moving object by the left eye view and the contours of the moving object by the right eye view, and in order to maintain the association relation between the left eye view and the right eye view and guarantee consistency of the contents of the contours of the moving object between by the left eye view and the right eye view, a constraint is needed for the association relation between the left eye view and the right eye view:

$$E_3 = \sum_{i=1}^{n_f} \|v_n^L(i) - v_n^{R \to L}(s(i))\|^2 + \sum_{i=1}^{n_f} \|v_n^R(i) - v_n^{L \to R}(s(i))\|^2$$

because the mesh positions of the next frame by the left eye view and the right eye view are unknown yet, so the association relation between them is not established directly, thus, the positions yielded after twice transmission of the coordinates of vertex positions of the meshes of the current frame are set as the direction for constraint optimization, for example, as for the constraint of association relation from the mesh of the left eye view to the mesh of the right eye view, the reliable vertex $v_c^L(i)$ of the mesh of current frame in the left eye view is firstly propagated to the position s(i) of next frame in the left eye view through the SIFT flow field between current frame and next frame in the left eye view and then the s(i) is propagated to the corresponding position $v_n^{R \to L}(s(i))$ in the right eye view through the SIFT flow field between next frame in the left eye view and next frame in the right eye view, the vertex position $v_n^R(i)$ of next frame in the right eye view and the calculated vertex position $v_n^{R \to L}(s(i))$ should be as close as possible, similarly, the association relation from the mesh in the right eye view to the mesh in the left eye view is also constrained;

$E_4$ is the constraint energy against vertical aligning, for a binocular stereo image, the corresponding contents in the left eye view and the right eye view are same in the vertically direction of image space, thus the coordinates of y to constrain the corresponding vertexes of the meshes in the left eye view and in the right eye view should be constrained to be similar as much as possible, the energy term here is as follows:

$$E_4 = \sum_{i=1}^{n} (v_n^L(i)[y] - v_n^R(i)[y])^2$$

these four energy terms constitute together the combined energy constraint against the contour propagation of the contours of the moving object and $\lambda_1 = \lambda_3 = \lambda_4 = 10$, $\lambda_2 = 1$ are set as a reference weight of each energy term.

3. The method of integrating binocular stereo video scenes while maintaining temporal consistency according to claim 1, further comprising:

the integrating and deforming of parallax of the contours of the moving object and the dynamic scene with temporal consistency comprises the sub-steps as follows:

calculating the disparity map of each frame of the stereo video A and the stereo video B; utilizing Poisson integration to merge the disparity map in the area corresponding to the contours of the moving object in the stereo video A and the disparity map of the stereo video B to yield an integration disparity map sequence which is denoted as $D = \{d_1, d_2, d_3 \ldots \}$;

utilizing a method based on perspective perception deformation to carry out the parallax integration and deformation whose result is then set as the initial solution;

adjusting and deforming automatically the parallax with temporal consistency for the contours of the moving object and the dynamic scenes of all other frames; assuming the result of deformation of the contours of the moving objects of frame i is known, then $V_i^L, V_i^R$ is separately set as the vertex collection of the triangle mesh corresponding to the contours of the moving object of frame i in the left eye view and in the right eye view, the result of deformation of the contours of the moving object of frame i+1 and frame i+2 is realized through minimization of the following energy equation:

$$N = \gamma_1 N_1 + \gamma_2 N_2 + \gamma_3 N_3$$

wherein: N denotes the overall energy, $N_1$ denotes the constraint energy for corresponding parallax, $N_2$ denotes the positioning constraint energy, $N_3$ denotes the constraint energy against mesh distortion of the contours of the moving object, and $\gamma_1, \gamma_2, \gamma_3$ denote the weight of each energy term;

the energy equation includes three energy terms which separately denote three types of constraint conditions, where $N_1$ is the constraint energy for parallax corresponding to constrain that the parallax of each vertex of the mesh of the contours of the moving object to be consistent with the parallax of the corresponding position of integrated disparity map;

$$N_1 = \sum_{v_t^L \in V_{i+1}^L, v_t^R \in V_{i+1}^R, v_o^L \in \hat{V}_{i+1}^L} (v_t^L[x] - v_t^R[x] - d_{i+1}(v_o^L))^2 +$$

$$\sum_{v_t^L \in V_{i+2}^L, v_t^R \in V_{i+2}^R, v_o^L \in \hat{V}_{i+2}^L} (v_t^L[x] - v_t^R[x] - d_{i+2}(v_o^L))^2;$$

$V_{i+1}^L, V_{i+1}^R$ separately denotes the mesh vertex collection after deformation of the contours of the moving object in frame i for the left eye view and the right eye view; $\hat{V}_{i+1}^L$ denotes the mesh vertex collection before moving object deformation of frame i+1 in the left eye view and the symbol representation of frame i+2 is same as that of frame i+1, and $v_t^L[x], v_t^R[x]$ denote the coordinates of x of the corresponding vertex;

$N_2$ is the positioning constraint energy to constrain that the position of geometric center of the contours of the moving object in the left eye view is the same as much as possible as the geometric center of the contours of the moving object in the left eye view before deformation;

$$N_2 = \left\| c_{i+1}^l - \frac{1}{|V^L|} \sum_{v_t^L \in V_{i+1}^L} v_t^l \right\|^2 + \left\| c_{i+2}^l - \frac{1}{|V^L|} \sum_{v_t^L \in V_{i+2}^L} v_t^l \right\|^2$$

$c_{i+1}^l, c_{i+2}^l$ are separately the mesh geometry center before the moving object deformation of frame i+1 and frame i+2 in the left eye view; $N_3$ is the constraint energy against mesh distortion of the contours of the moving object to constrain the deformation of previous and next frames as well as the left and right frames not to be too violent;

$$N_3 = \sum_{(v_{i+1}^L(t), v_{i+1}^L(j), v_{i+1}^L(k)) \in T_{i+1}^L} \delta_{i+1}^L \| v_{i+1}^L(t) - F^L(v_{i+1}^L(j), v_{i+1}^L(k)) \|^2 +$$

$$\sum_{(v_{i+1}^R(t), v_{i+1}^R(j), v_{i+1}^R(k)) \in T_{i+1}^R} \delta_{i+1}^R \| v_{i+1}^R(t) - F^R(v_{i+1}^R(j), v_{i+1}^R(k)) \|^2 +$$

$$\sum_{(v_{i+2}^L(t), v_{i+2}^L(j), v_{i+2}^L(k)) \in T_{i+2}^L} \delta_{i+2}^L \| v_{i+2}^L(t) - F^L(v_{i+2}^L(j), v_{i+2}^L(k)) \|^2 +$$

$$\sum_{(v_{i+2}^R(t), v_{i+2}^R(j), v_{i+2}^R(k)) \in T_{i+2}^R} \delta_{i+2}^R \| v_{i+2}^R(t) - F^R(v_{i+2}^R(j), v_{i+2}^R(k)) \|^2$$

$T_{i+1}^L, T_{i+1}^R$ are the triangle collection of the triangle mesh of the contours of the moving object of frame i+1, respectively, in the left eye view and the right eye view, $T_{i+2}^L, T_{i+2}^R$ is the triangle collection of the triangle mesh of the contours of the moving object of frame i+2 in the left eye view and the right eye view, v(t), v(j), v(k) are separately the three vertexes of the corresponding triangle, $F^L, F^R$ are separately the linear relation between different vertexes of each triangle of the mesh of the contours of the moving object of frame i in the left eye view and the right eye view, $\delta_{i+1}$ is the smoothing factor which is calculated with $e^{-\|F(v_{i+1}(j), v_{i+1}(k))-F(v_i(j),v_i(k))\|^2}$ and $\delta_{i+2}$ is calculated in the same way as $\delta_{i+1}$;

the energy terms constitute together the combined energy constraint against the moving object deformation with temporal consistency and $\gamma_1=50$, and $\gamma_2\gamma=_3=1$ are reference weights of each energy term; and after the adjusting and deforming the parallax, two solutions are generated for the coordinate of each vertex of the mesh corresponding to the contours of the moving object of each frame of the left eye view and the right eye view, the average value of the two solutions is calculated as the final result of deformation.

4. The method of integrating binocular stereo video scenes while maintaining temporal consistency according to claim 1, further comprising:

the color blending of the contours of the moving object and dynamic scene with temporal consistency is implemented through: utilizing a method of median coordinate fusion to calculate the internal vertexes of the contours of the moving object mesh against the median coordinate of the boundary vertexes of mesh; utilizing the color difference between the pixel corresponding to the median coordinates and the boundary points of the contours of the moving object and the pixel of the position corresponding to dynamic scene to calculate the color difference of the internal vertexes of the contours of the moving object; the color difference of the pixel points of non-vertex point(s) is obtained through linear interpolation of the color difference among three vertexes of the triangle mesh patch where the pixels of non-vertex lie in; add the color difference and the color value of the original pixel of the contours of the moving object to yield the result of color blending.

* * * * *